J. T. CORLEY.
BRAKE ROD GUIDE FOR AUTOMOBILES.
APPLICATION FILED OCT. 5, 1916.
1,209,128.
Patented Dec. 19, 1916.
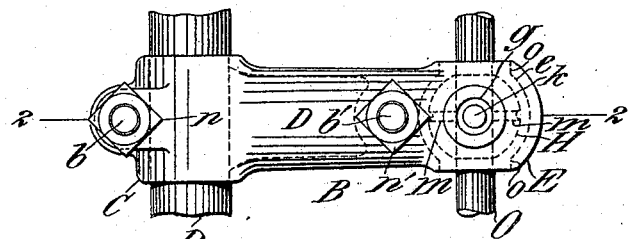
Fig. 1.
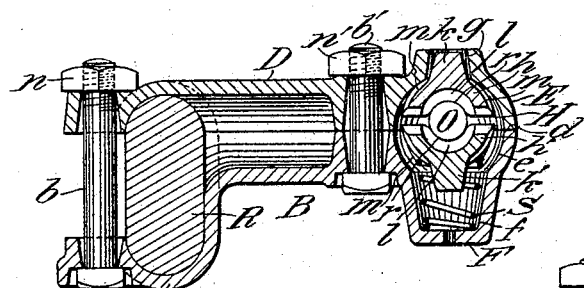
Fig. 2.
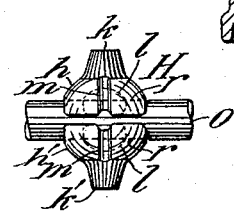
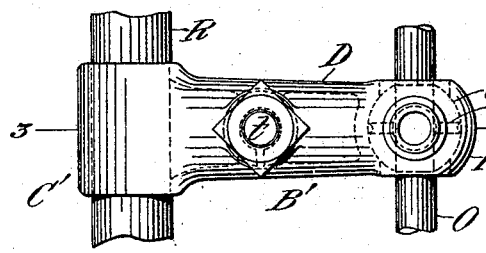
Fig. 3.      Fig. 4.
Fig. 5.
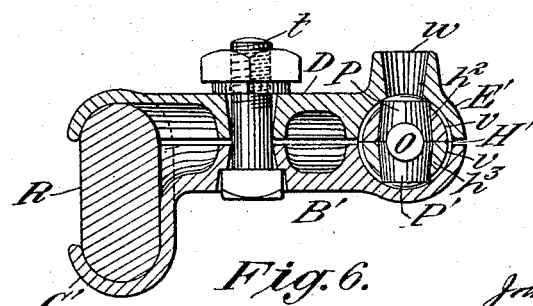
Fig. 6.
INVENTOR
John T. Corley
By
Arthur A. Armington
ATTORNEY

UNITED STATES PATENT OFFICE.

JOHN T. CORLEY, OF PROVIDENCE, RHODE ISLAND.

BRAKE-ROD GUIDE FOR AUTOMOBILES.

1,209,128.  Specification of Letters Patent.  Patented Dec. 19, 1916.

Application filed October 5, 1916. Serial No. 123,874.

*To all whom it may concern:*

Be it known that I, JOHN T. CORLEY, a citizen of the United States, residing at Providence, in the county of Providence, State of Rhode Island, have invented certain new and useful Improvements in Brake-Rod Guides for Automobiles, of which the following is a specification.

My invention relates to brake-rod guides for automobiles or other vehicles and consists of improvements in the construction and method of operation of the same.

The object of my improvement is to provide a device of this character for supporting the brake-rod or other like slidable member of a vehicle to restrain it from side play or unwarranted vibration, while allowing it to be moved longitudinally in performing its function.

The invention is fully explained in the following specification, illustrated by the accompanying drawings, in which like reference characters designate like parts.

In the drawings: Figure 1 is a plan view of the preferred embodiment of my improved device; Fig. 2, a vertical, sectional view of the same taken on the line 2—2 of Fig. 1; Figs. 3 and 4, detail views showing certain details of construction of the device; Fig. 5, a plan view of a modified form of the device; and Fig. 6, a sectional view of the same taken on the line 3—3 of Fig. 5.

My present improvement is directed particularly to brake-rod guides or anti-rattling devices in which the sliding rod or similar part is held in a bearing under resilient pressure to restrain it from unwarranted vibration or chattering.

The particular object of my improvement is to provide a bearing for the rod which, while performing the function above explained, will allow for an easier sliding movement of the rod therethrough and also permit an angular displacement of the rod as sometimes required. Through this improvement less restraint is offered to the manual operation of the rod and hence its action is rendered more positive and easier of control.

Referring first to Figs. 1 and 2, the supporting-member B for the brake-rod bearing is preferably constructed in the form of a clamp C adapted to be secured to a rigid portion of the running-gear of the vehicle, such as the radius-rod R. Extending from the side of the clamp C is an arm D which, as shown in Fig. 2, is made of hollow, cylindrical form to lighten the structure. The member B is preferably constructed in two parts, divided horizontally at $d$, to facilitate its application to the radius-rod R. Two bolts $b$ and $b'$ extend through the upper and lower halves of the member B and the nuts $n$, $n'$ on their ends serve to draw the parts together to bind the clamp C against the side of the rod R.

At the outer end of the arm D is an enlargement or head E formed with a spherical chamber $e$ on its interior. Depending from the head E is a projection F in which is formed a spring-pocket $f$ opening into the upper chamber or cavity $e$. At the top of the cavity $e$ is a smaller opening $g$, and on its opposite sides are enlarged openings $o\ o$ through which the brake-rod O passes. Fitted to float freely in the cavity $e$ is a split ball-member H comprising two separate halves $h$ and $h'$ formed with tapered projections $k\ k'$ on their top and bottom sides. The two halves of the ball H are slotted at $r$ to adapt them to fit over the brake-rod O, as shown in Fig. 3, and their centers are cored out at $l$, $l$ to save metal and lighten their weight. Scored on the sides of the ball-members are oil-grooves $m$, $m$ which serve for a purpose as later explained.

The ball-member H forms the main bearing for the brake-rod O and its parts are assembled in the head E as next described. Seated in the pocket $f$ is a coiled spring S against which the lower part $h'$ of the ball H rests with its projection $k'$ inclosed thereby. The lower half of the member B is applied to the radius-rod R with the brake-rod O extending through the openings $o$, $o$ in the sides of its head E and seated in the groove $r$ of the ball-section $h'$. The upper ball-part $h$ is placed on top of the brake-rod O in the position illustrated in Fig. 3, and the upper half of the member B is then fitted thereover as shown in Fig. 2. The bolts $b$, $b'$ are next inserted in place and their nuts $n$, $n'$ applied thereto to secure the parts together and bind the clamp C against the radius-rod R. With the several parts thus assembled the spring S presses the lower half $h'$ of the ball H against the rod O and the upper half $h$ is forced up against the top of the bearing-chamber $e$. The projection $k$ on the top of the ball H seats in the opening $g$ to hold the half $h$ in position while allowing it to turn freely in the cavity e. The opening g also provides for the introduction of oil which leads down through the grooves m to lubricate the ball H in its bearing while also lubricating the bearing for the rod O within the ball. It will be noted from Fig. 4 that the openings o in the sides of the head E are considerably larger than the central opening through the ball H. This provides a clearance for the brake-rod O so that the latter may swing freely to one side or the other. In automobiles of the "Ford" type the brake-rod O generally extends at an angle to the side of the radius-rod R and its inclination is variable during its operation. That is to say, when the rod is pushed or pulled in applying and releasing the brakes the rod will sometimes bend or buckle, and under such action the bearing-member H accommodates itself to the alinement of the rod. The floating relation of the ball H with the bearing-member B also renders the device universally attachable to cars in which the angular relation of the rods R and O varies considerable, since the ball will always find its proper position in accordance with the position of the rod O. Another advantage of the present construction is that the ball H being self-alining with the brake-rod O it will offer less resistance to the movement of the rod during its operation. The two halves of the ball are also self-conforming to any irregularities in the size or shape of the rod so that resistance to its movement from these sources is obviated. It is also called to attention that in the present improved construction the two parts of the member B may be applied to use without disconnecting the end of the brake-rod O to insert it through its bearing.

Figs. 5 and 6 show a modification in the arrangement of the device in which I employ resilient plugs bearing on the brake-rod O instead of the spring S. In this embodiment of the invention the bearing-member B' is made in two parts, as before described, but with a space between its opposite halves as shown in Fig. 6. The ball H' is also constructed in two parts, but these fit closely against each other and also snugly within the bearing-cavity e'. A single bolt t is employed to draw the parts of the member B together, and this serves not only to secure the clamp C' against the radius-rod R, but also to bind the two parts of the head E' against the ball H'. Inserted in openings in the ball-parts $h^2$, $h^3$ are the tapered plugs P, P' preferably constructed from hard wood, fiber or some like material. The plugs P, P' are grooved to adapt them to fit around the rod O and when the two parts of the ball H' are clamped together they bind the plugs against the rod. Oil-grooves $v$ on the periphery of the ball H' allow for the flow of the lubricant introduced through the opening w around the sides of the ball to provide for a free turning movement of the latter in its bearing so that it may adjust itself to the position of the brake-rod sliding therethrough. The plug P also serves as a lubricating medium for the rod O itself, as the oil leaches down and saturates it to reduce the friction during the movement of the rod. The resilience of the plugs P, P' provides for a slight pressure on the rod to hold it from play or vibration and also to compensate for wear. In this manner a constant pressure is maintained on the brake-rod O to prevent it from rattling or chattering while, at the same time, it is allowed to slide freely in its lubricated bearing.

Without limiting myself to the precise construction and arrangement of the parts herein shown and described, what I claim is:—

1. In a brake-rod guide for automobiles or other vehicles, the combination with a member adapted to be attached to a fixed part of the vehicle and provided with a spherical bearing-chamber having openings on its sides, of a split ball mounted in the chamber and fitted to inclose a brake-rod or similar part extending through the side openings thereof, and means for exerting a resilient pressure of the parts of the ball against the rod while allowing the ball to adjust itself in its bearings.

2. In a brake-rod guide for automobiles or other vehicles, the combination with a clamp-member adapted to be attached to a fixed part of the vehicle and formed with an arm having a spherical recess at its end, of a two-part ball mounted to float in the recess with its parts inclosing the brake-rod or similar member which extends therethrough, and resilient means for pressing the two parts of the ball against the rod while allowing it to adjust itself in its bearing to provide for the angular displacement of the rod.

3. In a brake-rod guide for automobiles or other vehicles, the combination with a two-part clamp-member adapted to fit around a fixed part of the vehicle and formed with a split arm having a spherical cavity at its end, means to draw the parts of the member together to clamp it in place, a split ball mounted to float in the cavity of the arm with its parts inclosing the brake-rod extending therethrough, and a spring pressing against the side of the ball to hold its parts bearing against the brake-rod to prevent lateral play or vibration thereof, while allowing for sliding movement and angular displacement of the rod.

4. In a brake-rod guide for automobiles or other vehicles, the combination with a bearing-member having a two-part clamp at one end and a split arm extending therefrom with a spherical cavity at its end formed with an opening at its top, of a bolt extending through the parts of the member to bind the clamp against a fixed part of the vehicle, a two-part ball mounted in the cavity of the arm with a projection on its top seated in the opening therethrough, and a spring seated in the bottom of the cavity pressing against the under side of the ball to maintain its parts bearing against the brake-rod extending therethrough while providing for a swiveling movement of the rod as it slides in the bearing.

5. In a brake-rod guide for automobiles or other vehicles, the combination with a two-part clamp-member adapted to be secured to a fixed part of the vehicle and formed with an arm having a spherical cavity at its end with an opening in its top and a spring-pocket on its under side, a split ball mounted in said cavity and formed with a projection seated in the upper opening thereof, said ball having its parts formed to inclose a brake-rod extending therethrough and provided with oil-grooves on its sides, and a coiled spring seated in the pocket of the cavity and bearing against the under side of the ball to maintain its parts bearing against the brake-rod in the manner and for the purpose substantially as described.

In testimony whereof I affix my signature.

JOHN T. CORLEY.

Copies of this patent may be obtained for five cents each, by addressing the "Commissioner of Patents, Washington, D. C."